(12) United States Patent
Wang

(10) Patent No.: US 9,307,334 B2
(45) Date of Patent: Apr. 5, 2016

(54) METHOD FOR CALCULATING AUDIO LATENCY IN REAL-TIME AUDIO PROCESSING SYSTEM

(71) Applicant: GOOGLE INC, Mountain View, CA (US)

(72) Inventor: Zhonglei Wang, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 464 days.

(21) Appl. No.: 13/756,197

(22) Filed: Jan. 31, 2013

(65) Prior Publication Data

US 2015/0201292 A1    Jul. 16, 2015

(51) Int. Cl.
*H04M 9/08* (2006.01)
*H04R 29/00* (2006.01)

(52) U.S. Cl.
CPC .................................. *H04R 29/00* (2013.01)

(58) Field of Classification Search
CPC ....... H04M 9/082; H04M 3/002; G10L 21/02
USPC ........................................ 379/406.01, 406.06
See application file for complete search history.

(56) References Cited

U.S. PATENT DOCUMENTS

| | | | |
|---|---|---|---|
| 6,327,249 B1 * | 12/2001 | Cookman et al. | 370/235 |
| 6,850,557 B1 * | 2/2005 | Gronemeyer | 375/150 |
| 2007/0165837 A1 * | 7/2007 | Zhong et al. | 379/406.01 |
| 2014/0064476 A1 * | 3/2014 | Mani et al. | 379/406.08 |

* cited by examiner

*Primary Examiner* — Alexander Jamal
(74) *Attorney, Agent, or Firm* — Birch, Stewart, Kolasch & Birch, LLP

(57) ABSTRACT

Methods and systems are provided for determining audio latency in both audio capture and audio playout processes in a real-time audio processing system by calculating time differences with respect to interrupts. The audio capture and playout latencies may be utilized for improved audio processing, such as AEC. The methods provided address two major problems with existing techniques. First, on platforms where the system does not provide API to obtain audio latency, the methods allow the application to obtain more accurate audio latency. Second, the application may utilize a unified and simplified technique to obtain audio latency instead of using platform-specific APIs on different platforms.

24 Claims, 7 Drawing Sheets

METHOD FOR CALCULATING AUDIO LATENCY IN REAL-TIME AUDIO PROCESSING SYSTEM

TECHNICAL FIELD

The present disclosure generally relates to a method for audio processing. More specifically, aspects of the present disclosure relate to determining audio latency for audio capture and audio playout for use in audio processing.

BACKGROUND

With many forms of audio processing it is very important to calculate accurate audio latency (e.g., audio delay). For example, acoustic echo cancellation (AEC) relies heavily on an audio application supplying accurate audio latency information. If the audio application does not supply accurate latency information, AEC will not work properly.

FIG. 1 is a graphical representation illustrating an example of acoustic echo. With some platforms, the audio application can call a system application programming interface (API) to obtain the audio latency. For example, the audio application on LINUX can call snd_pcm_delay( ) to obtain the audio latency. However, there are two problems associated with this. First, on some mobile platforms applications may access the audio driver; however, the audio driver does not provide APIs that can obtain the audio latency. Additionally, some platforms add an extra layer between the audio driver and the application. For example, the application may be able to access the audio driver through an "audio services" layer, which makes it more difficult to accurately calculate audio latency. FIGS. 2A and 2B illustrate this problem.

Second, on different platforms the applications must use different system APIs to obtain audio latency, which makes it difficult for developers to maintain software. Because on some platforms the audio application is unable to obtain accurate audio latency, it is necessary to use acoustic echo suppression (AES) instead of AEC, which presents additional problems since AES only suppresses echo rather than remove it.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a computer-implemented method for determining audio delay, the method comprising: in response to initializing an audio capture interrupt event, obtaining a first reference time; resetting a capture interrupt counter configured to count number of capture interrupt events; reading a segment of audio data from a sound card; in response to reading the segment of audio data from the sound card, updating the capture interrupt counter and obtaining a second reference time; and calculating audio capture delay using the first reference time, the second reference time, and the updated capture interrupt counter.

According to another embodiment, the method for determining audio delay further comprises: calculating a size of an audio capture buffer configured for storing audio data input from a capture device; and passing the audio capture buffer to the sound card.

According to another embodiment, the method for determining audio delay further comprises sending the calculated audio capture delay to an audio processing component.

According to yet another embodiment of the method for determining audio delay, the step of calculating the audio capture delay includes calculating a difference between the first reference time and the second reference time; and combining the difference between the first and second reference times with the size of the audio capture buffer and the updated capture interrupt counter.

Another embodiment of the present disclosure relates to a computer-implemented method for determining audio delay, the method comprising: in response to initializing an audio playout interrupt event, obtaining a first reference time; resetting a playout interrupt counter configured to count number of playout interrupt events; writing a segment of audio data to a sound card; in response to writing the segment of audio data to the sound card, updating the playout interrupt counter and obtaining a second reference time; and calculating audio playout delay using the first reference time, the second reference time, and the updated playout interrupt counter.

According to another embodiment, the method for determining audio delay further comprises: calculating a size of an audio playout buffer configured for storing audio data to be output by a playout device; and passing the audio playout buffer to the sound card.

According to still another embodiment, the method for determining audio delay further comprises sending the calculated audio playout delay to an audio processing component.

According to yet another embodiment of the method for determining audio delay, the step of calculating the audio playout delay includes: calculating a difference between the first reference time and the second reference time; and combining the difference between the first and second reference times with the size of the audio playout buffer and the updated playout interrupt counter.

According to one or more other embodiments of the present disclosure, the methods presented herein may optionally include one or more of the following additional features: the audio capture/playout delay is further calculated using the size of the audio capture/playout buffer; the step of updating the capture/playout interrupt counter includes increasing the capture/playout interrupt counter; the audio processing component is an acoustic echo canceller; prior to the step of combining the difference between the first and second reference times with the size of the audio capture/playout buffer and the updated capture/playout interrupt counter, the updated capture/playout interrupt counter is multiplied by a length of the segment of audio data.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
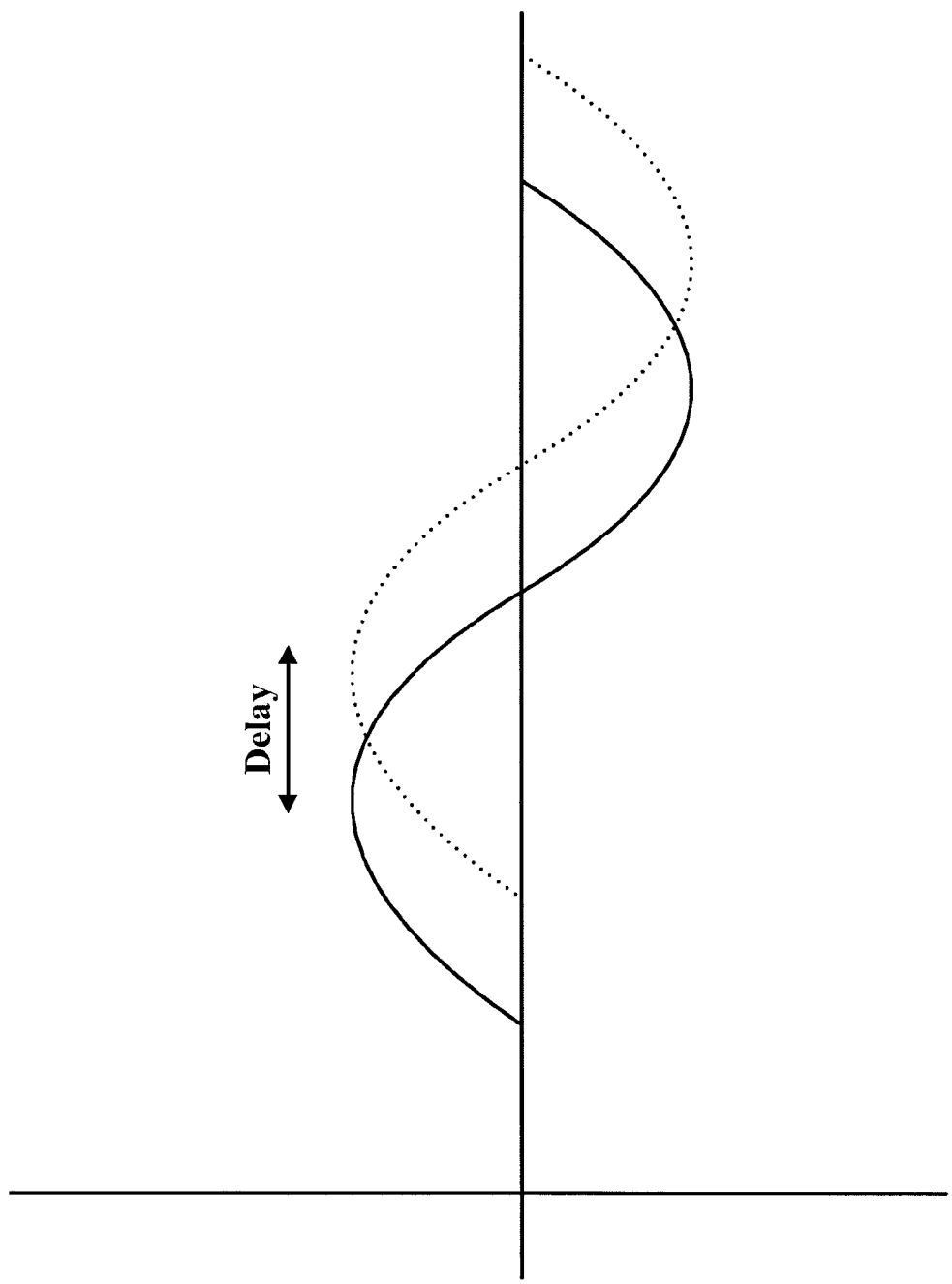
FIG. 1 is a graphical representation illustrating an example of acoustic echo.
Figure 2B:
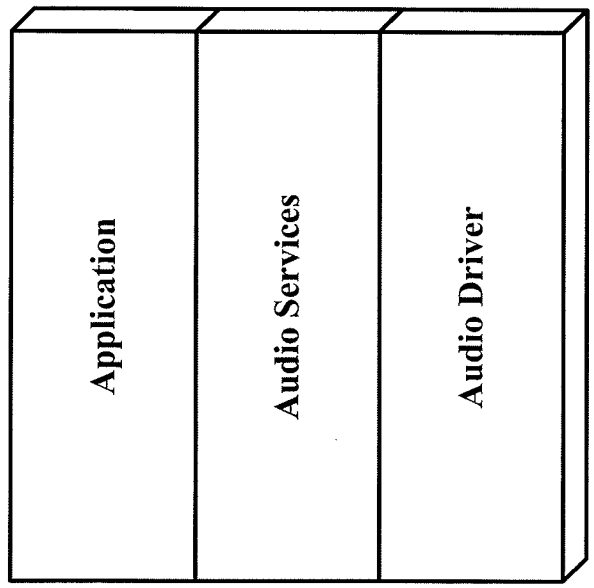
FIG. 2B is a block diagram illustrating an example of a platform including an audio application, an audio driver, and audio services.
Figure 2A:
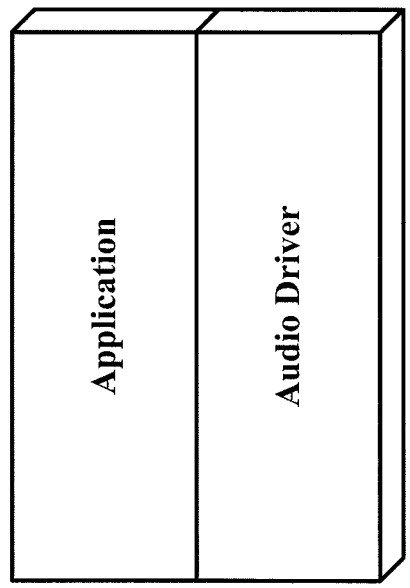
FIG. 2A is a block diagram illustrating an example of a platform including an audio application and an audio driver.

The headings provided herein are for convenience only and do not necessarily affect the scope or meaning of the claims.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that the embodiments described herein may be practiced without many of these details. Likewise, one skilled in the relevant art will also understand that these embodiments can include many other obvious features not described in detail herein. Additionally, some well-known structures or functions may not be shown or described in detail below, so as to avoid unnecessarily obscuring the relevant description.

Embodiments of the present disclosure relate to methods and systems for determining audio latency (e.g., delay) in both audio capture and audio playout processes in a real-time audio processing system by calculating time differences with respect to interrupts. As will be described in greater detail herein, the audio capture and playout latencies may be utilized for improved audio processing, such as AEC. Additionally, embodiments described herein address two major problems with existing techniques. First, on platforms where the system does not provide API to obtain audio latency, the algorithm presented herein allows the application to obtain more accurate audio latency. Second, the application may utilize a unified and simplified approach to obtain audio latency instead of using platform-specific APIs on different platforms.

Many factors can affect audio latency in a real-time audio processing system. However, on most modern computer systems and mobile systems, the audio latency (T) can be calculated simply by the number of data that have been written into the sound card or read from the sound card ($T_a$) minus the elapsed time ($T_e$), which may be expressed as $T=F(T_a, T_e)=T_a+/-T_e$.

Because an audio application can control how much audio data will be read from or written into the sound card, $T_a$ can be accurately calculated. Additionally, most computer systems and mobile systems are equipped with at least one high-resolution timer, and therefore $T_e$ can be accurately calculated as well. An application must also consider the size of the initial audio buffer. However, as long as the application can setup the audio buffer or detect audio buffer size on the sound card, the algorithm described herein should work for improved audio processing.

Figure 3:
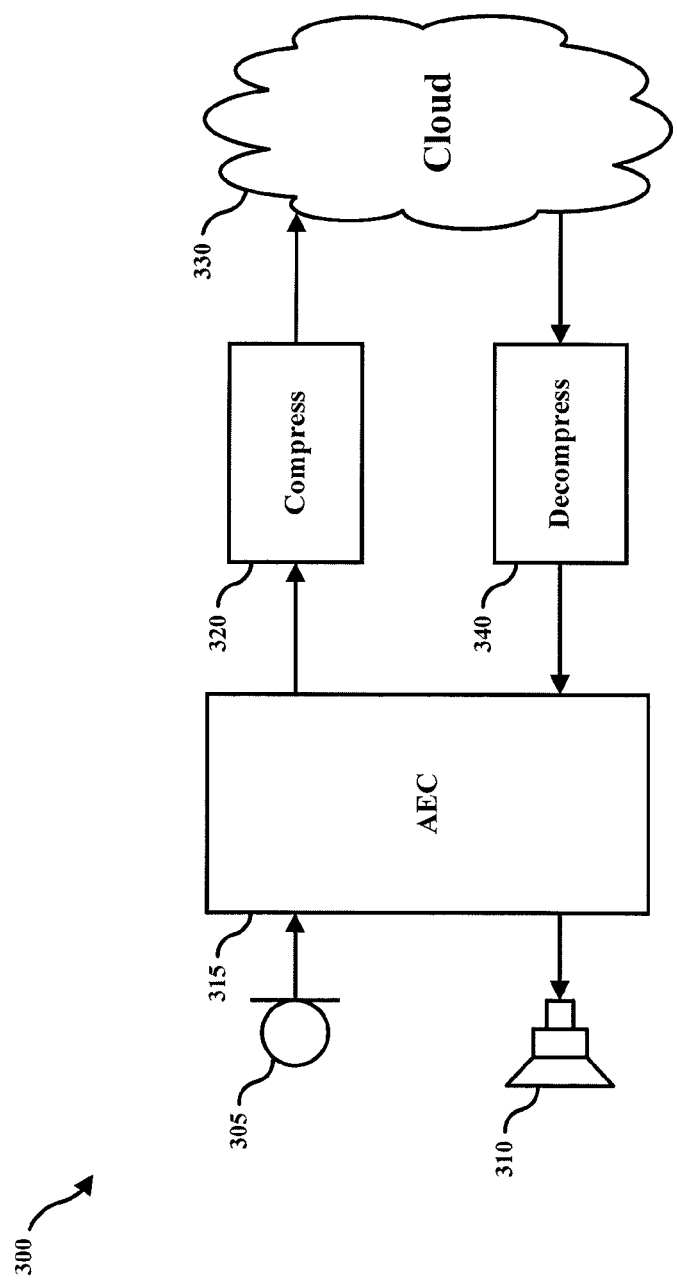
FIG. 3 is a block diagram illustrating an example audio processing system in which one or more embodiments described herein may be implemented.

FIG. 3 illustrates an example system for real-time audio processing according to one or more embodiments of the present disclosure, in which time differences in audio capture and playout processes may be used to determine audio latency. In at least the embodiment shown, the real-time audio processing system 300 includes audio capture 305, audio playout 310, acoustic echo cancellation 315, and audio compression 320 and decompression 340 paths or processes. The system 300 may be in communication with one or more other systems and/or devices via a network 330.

Audio capture 305 may be performed by any of a variety of audio input devices, such as one or more microphones configured to capture sound (e.g., voice) and generate input signals. Audio playout 310 may be performed by any of a variety of audio output devices, including a loudspeaker or group of loudspeakers configured to output sound of one or more channels. For example, audio capture 305 and audio playout 310 may be hardware devices internal to a computer system, or external peripheral devices connected to a computer system via wired and/or wireless connections. In some arrangements, audio capture 305 and audio playout 310 may be components of a single device, such as a mobile telephone, speakerphone, portable telephone handset, etc. Additionally, one or both of audio capture 305 and audio playout 310 may include analog-to-digital and/or digital-to-analog transformation functionalities.

The system 300 may include an audio capture buffer (not shown) configured between the audio capture 305 and the compression process 320, and may also include an audio playout buffer (not shown) configured between the decompression 340 and audio playout 310 processes. Audio data may be copied from the audio capture device 305 (e.g., a microphone) and stored in the capture buffer before being passed through echo cancellation 315, which also utilizes audio data received at the system 300 for playout 310. In accordance with at least one embodiment, audio latency may be determined before captured audio data is passed through AEC, thereby providing a more accurate measure of audio latency and improving AEC performance.

It should be noted that, depending on the implementation, the compression 320 and/or decompression 340 may be performed by a single component or by several components in the system 300. Additionally, either of the compression 320 and/or decompression 340 processes may be a sub-process in a larger audio processing scheme (not shown). In some embodiments of the present disclosure, one or more other components, modules, units, etc., may be included as part of the real-time audio processing system 300, in addition to or instead of those illustrated in FIG. 3.

Figure 4:
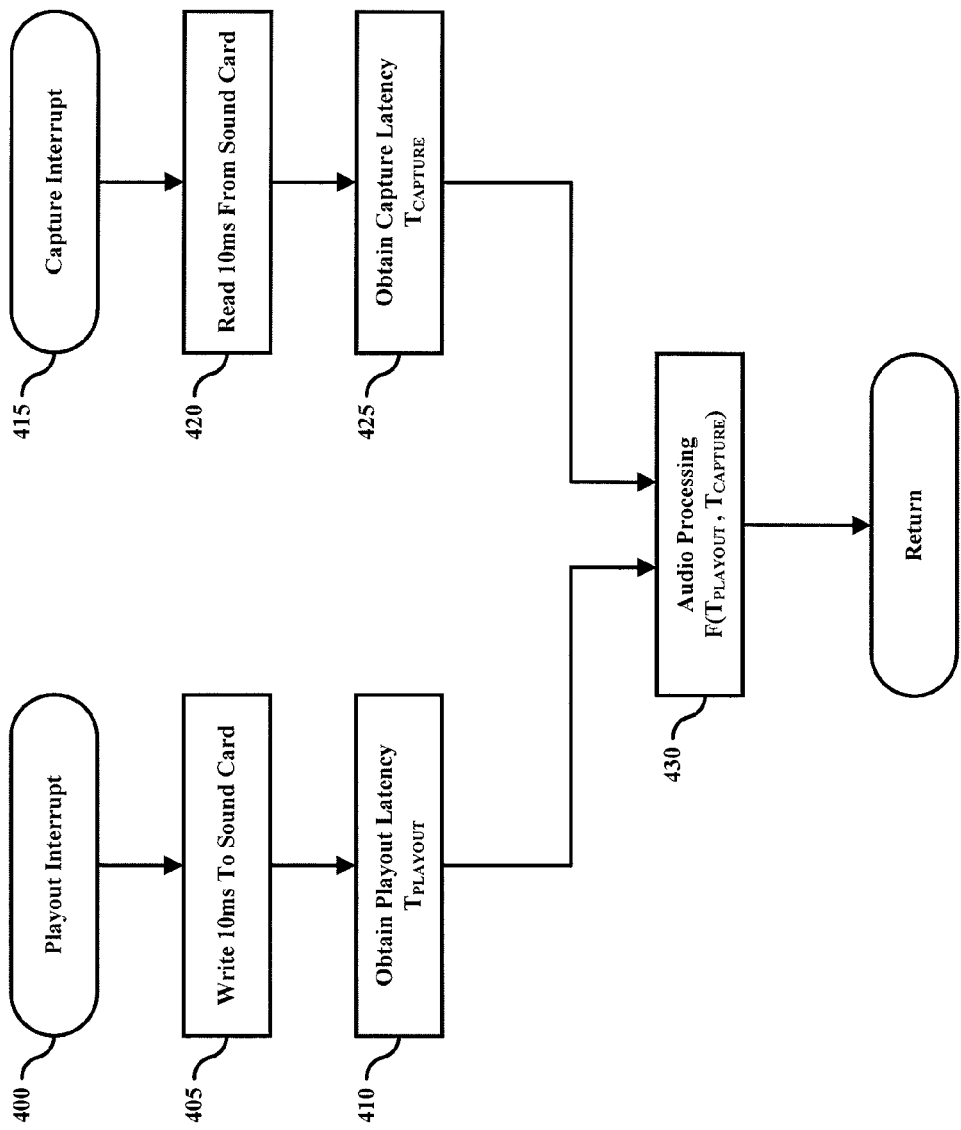
FIG. 4 is a flowchart illustrating an example method for using audio capture and playout latencies in audio processing according to one or more embodiments described herein.

FIG. 4 illustrates an example process for using audio capture and playout latencies in audio processing according to one or more embodiments described herein. Audio playout 400 and capture 415 could be driven by different threads. On the playout thread 400, an audio application may write a segment (e.g., 10 milliseconds (ms)) of audio data to an audio device (e.g., sound card) 405 and then calculate the playout latency 410. On the capture thread 415, the application may read a segment (e.g., 10 ms) of audio data from the sound card 420 and then calculate the capture latency 425. The playout thread 400 and capture thread 415 may then pass the calculated playout latency and capture latency, respectively, to the audio processing (e.g., echo cancellation) block 430.

Sound card playout and capture processes may be driven by software interrupt. In each interrupt, the application may either read 10 ms of audio data from the sound card or write 10 ms audio data to the sound card. As such, the audio latency for playout may be expressed as $T=10\ ms*N_{interrupt\_playout}-T_e$, where $N_{interrupt\_playout}$ is the number of playout interrupt (where "N" is an arbitrary number). Similarly, for capture or recording, the audio latency could be expressed as $T=T_e-10\ ms*N_{interrupt\_capture}$, where $N_{interrupt\_capture}$ is the number of capture interrupt.

Figure 5:
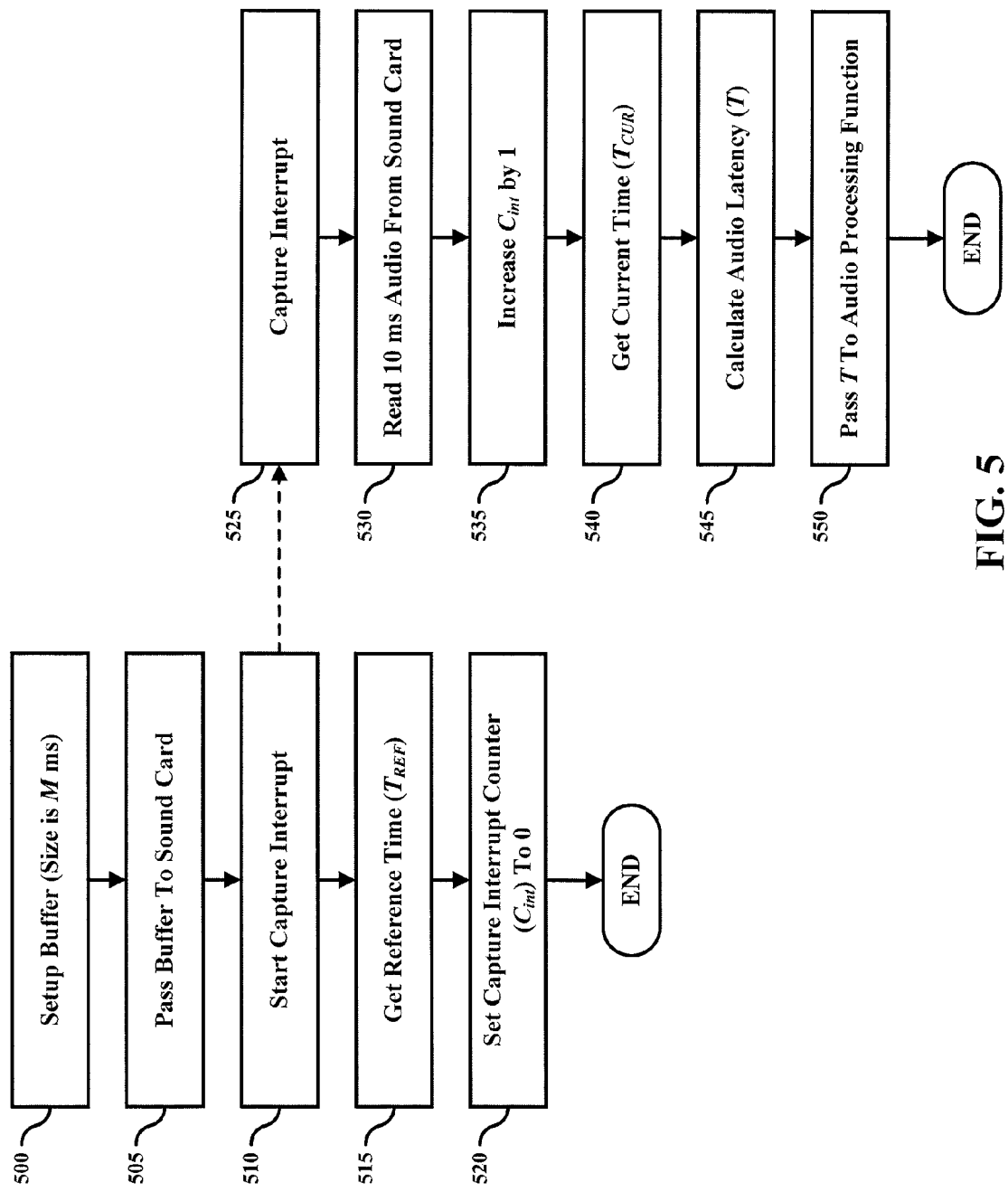
FIG. 5 is a flowchart illustrating an example method for determining audio capture latency using a timer according to one or more embodiments described herein.
Figure 6:
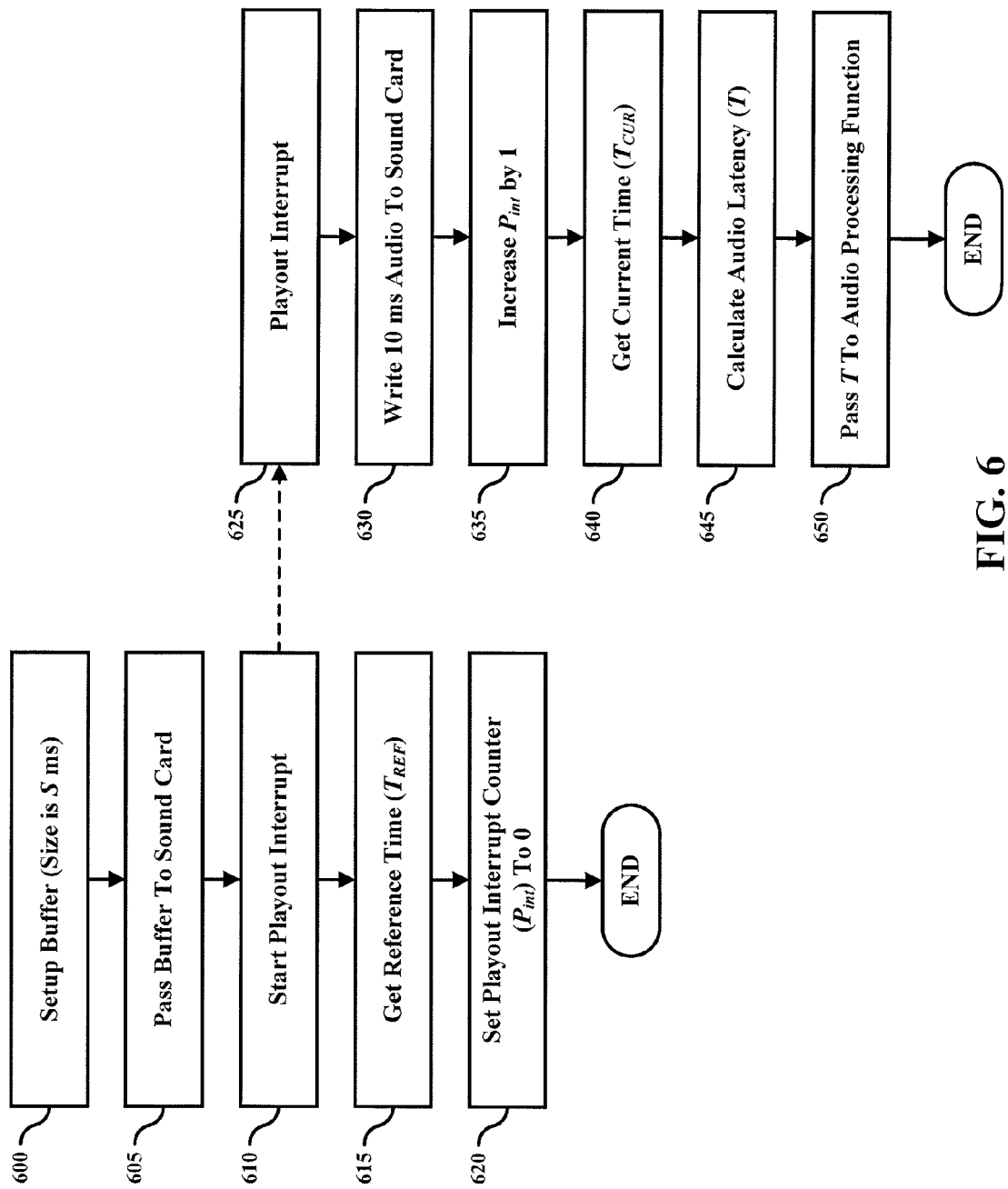
FIG. 6 is a flowchart illustrating an example method for determining audio playout latency using a timer according to one or more embodiments described herein.

FIGS. 5 and 6 illustrate example methods for determining audio latencies in audio capture and playout processes, respectively.

In FIG. 5, the method for determining audio latency in an audio capture process may begin at block 500 where an application may setup the initial size of an audio capture buffer to M ms (where "M" is an arbitrary number). At block 505, the audio buffer may be passed to the sound card.

At block 510, an audio capture interrupt event may start, which is represented by a broken line from block 510 to block 525. The process may move from block 510 to block 515, where the system time (e.g., at the time of the capture interrupt start) may be obtained and stored as a reference time ($T_{REF}$). At block 520, a counter for the number of capture interrupts, $C_{int}$, may be reset (e.g., set to zero or cleared).

Within each capture interrupt, which may begin at block 525, the process may move to block 530 where a segment (e.g., 10 ms) of audio data may be read from the sound card. At block 535, the capture interrupt counter, $C_{int}$, may be updated (e.g., increased incrementally, such as by 1), and at block 540 the current system time may be obtained and stored ($T_{CUR}$). The process may then move to block 545, where audio latency (T) may be calculated as $T=M+(T_{CUR}-T_{REF})-C_{int}*10\ ms$. At block 550, the audio latency (T) determined at block 545 may be passed to an audio processing function or module (e.g., AEC, $Function_{AEC(T)}$).

FIG. 6 illustrates a method for determining audio latency in an audio playout process. In at least one embodiment, the method for determining audio latency in the playout process may proceed in a manner similar to the method for determining audio latency in the capture process described above and illustrated in FIG. 5.

The process may begin at block 600 where an application may setup the initial size of an audio playout buffer to S ms (where "S" is an arbitrary number). At block 605, the audio playout buffer may be passed to the sound card.

At block 610, an audio playout interrupt event may start, which is represented by a broken line from block 610 to block 625. The process may move from block 610 to block 615, where the system time (e.g., at the time of the playout interrupt start) may be obtained and stored as a reference time ($T_{REF}$). At block 620, a counter for the number of playout interrupts, $P_{int}$, may be reset (e.g., set to zero or cleared).

Within each playout interrupt, which may begin at block 625, the process may move to block 630 where a segment (e.g., 10 ms) of audio data may be written to the sound card. At block 635, the playout interrupt counter, $P_{int}$, may be updated (e.g., increased incrementally, such as by 1), and at block 640 the current system time may be obtained and stored ($T_{CUR}$). The process may then move to block 645, where audio latency (T) may be calculated as $T=S+P_{int}*10\ ms-(T_{CUR}-T_{REF})$. At block 650, the audio latency (T) determined at block 645 may be passed to an audio processing function or module (e.g., AEC, $Function_{AEC(T)}$).

Figure 7:
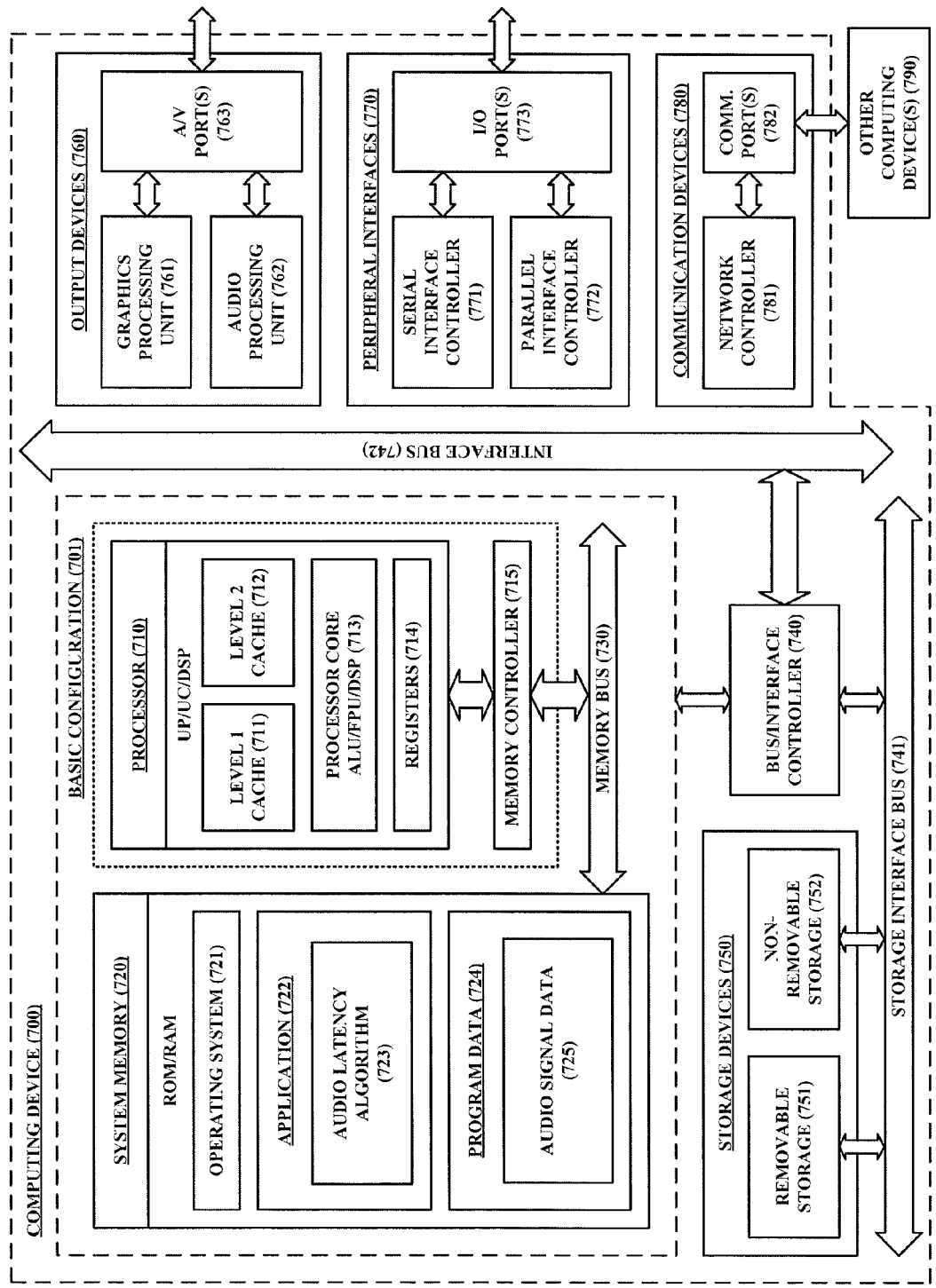
FIG. 7 is a block diagram illustrating an example computing device arranged for determining audio latency in audio capture and audio playout processes based on a timer according to one or more embodiments described herein.

FIG. 7 is a block diagram illustrating an example computing device 700 that is arranged for determining audio latencies in audio capture and audio playout processes based on calculated time differences for interrupt events in accordance with one or more embodiments of the present disclosure. In a very basic configuration 701, computing device 700 typically includes one or more processors 710 and system memory 720. A memory bus 730 may be used for communicating between the processor 710 and the system memory 720.

Depending on the desired configuration, processor 710 can be of any type including but not limited to a microprocessor (µP), a microcontroller (µC), a digital signal processor (DSP), or any combination thereof. Processor 710 may include one or more levels of caching, such as a level one cache 711 and a level two cache 712, a processor core 713, and registers 714. The processor core 713 may include an arithmetic logic unit (ALU), a floating point unit (FPU), a digital signal processing core (DSP Core), or any combination thereof A memory controller 715 can also be used with the processor 710, or in some embodiments the memory controller 715 can be an internal part of the processor 710.

Depending on the desired configuration, the system memory 720 can be of any type including but not limited to volatile memory (e.g., RAM), non-volatile memory (e.g., ROM, flash memory, etc.) or any combination thereof System memory 720 typically includes an operating system 721, one or more applications 722, and program data 724. In at least some embodiments, application 722 includes an audio latency algorithm 723 that is configured to determine audio latency using measured time differences in audio capture and playout processes. The audio latency algorithm 723 is further arranged to provide the calculated audio latencies to one or more audio processing functions or modules (e.g., AEC) for improved performance.

Program Data 724 may include audio signal data 725 that is useful for determining the time at which capture and playout interrupts occur. In some embodiments, application 722 can be arranged to operate with program data 724 on an operating system 721 such that time differences for audio capture and playout events may be utilized using the audio latency algorithm 723 to obtain a measure of audio latency for use by one or more audio processing functions (e.g. AEC).

Computing device 700 can have additional features and/or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or any combination thereof Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of computing device 700.

Computing device 700 can also include an interface bus 742 for facilitating communication from various interface devices (e.g., output interfaces, peripheral interfaces, communication interfaces, etc.) to the basic configuration 701 via the bus/interface controller 740. Example output devices 760 include a graphics processing unit 761 and an audio processing unit 762, either or both of which can be configured to communicate to various external devices such as a display or speakers via one or more A/V ports 763. Example peripheral interfaces 770 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773.

An example communication device 780 includes a network controller 781, which can be arranged to facilitate communications with one or more other computing devices 790 over a network communication (not shown) via one or more communication ports 782. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency trade-offs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A computer-implemented method for determining audio delay, the method, comprising:
    in response to initializing an audio capture interrupt event, obtaining a first reference time;
    setting a capture interrupt counter configured to count number of capture interrupt events;
    reading segment of audio data from a sound card;
    in response to reading the segment of audio data from the sound card, updating the capture interrupt counter and obtaining a second reference time; and
    calculating audio capture delay using the difference between the first and second reference times, a size of an audio capture buffer configured for storing audio data input from a capture device, and the undated capture interrupt counter multiplied by a length of the segment of audio data.

2. The method of claim 1, further comprising:
    calculating the size of the audio capture buffer; and
    passing the contents of the audio capture buffer to the sound card.

3. The method of claim 1, wherein updating the capture interrupt counter includes increasing the capture interrupt counter.

4. The method of claim 1, further comprising sending the caculated audio capture delay to an audio processing component.

5. The method of claim 4, wherein the audio processing component is an acoustic echo canceller.

6. The method of claim 1, wherein calculating the audio capture delay includes:
    combining the difference between the first and second reference time with the size of the audio capture buffer and the updated capture interrupt counter muitiplied by the length of the segment of audio data.

7. A computer-implemented method for determining audio delay, the method comprising:
    in response to initializing an audio playout interrupt event, obtaining a first reference time;
    setting a playout interrupt counter configured to count number of playout interrupt events;
    writing a segment of audio data to a sound card;
    in response to writing the segment of audio data to the sound card, updating the playout interrupt counter and obtaining a second reference time; and
    calculating audio playout delay using the difference between the first and second reference time, a size of an audio playout buffer configured for storing audio data to be output by the playout device, and the updated playout interrupt counter multiplied by a length of the segment of audio data.

8. The method of claim 7, further comprising:
    calculating the size of the audio playout buffer; and
    passing the contents of the audio playout buffer to the sound card.

9. The method of claim 7, wherein updating the playout interrupt counter includes increasing the playout interrupt counter.

10. The method of claim 7, further comprising sending the calculated audio playout delay to an audio processing component.

11. The method of claim 10, wherein the audio processing component is an acoustic echo canceller.

12. The method of claim 7, wherein calculating the audio playout delay includes:
    combining the difference between the first and second reference times with the size of the audio playout buffer and the updated playout interrupt counter multiplied by the length of the segment of audio data.

13. A system for determining audio delay, the system comprising:
    a least one processor; and
    a non-transitory computer-readable medium coupled to the at least one processor having instructions stored thereon that, when executed by the at least one processor, causes the at least one processor to:
        in response to initializing an audio capture interrupt event, obtain a first reference time;
        set a capture interrupt counter configured to count number of interrupt events;
        read a segment of audio data from a sound card;
        in response to reading the segment of audio data from the sound card, update the capture interrupt counter and obtain a second reference time; and
        calculate audio capture delay using the difference between the first and second reference times, a size of audio capture buffer configured for storing audio data input from a capture device, and the updated capture interrupt counter multiplied by a length of the segment of audio data.

14. The system of claim 13, wherein the at least one processor is further caused to:
    calculate the size of the audio capture buffer; and
    pass the contents of the audio capture buffer to the sound card.

15. The system of claim 13, wherein the at least one processor is further caused to:
    update the capture interrupt counter by increasing the capture interrupt counter.

16. The system of claim 13, wherein the at least one processor is further caused to:
    send the calculated audio capture delay to an audio processing component.

17. The system of claim 13, wherein the at least one processor is further caused to:
    send the calculated audio capture delay to an acoustic echo canceller.

18. The system of claim 13, wherein the at least one processor is further caused to:
    calculate the audio capture delay by combining the difference between the first and second reference times with the size of the audio capture buffer and the update capture interrupt counter multiplied by the length of the segment of audio data.

19. A system for determining audio delay, the system comprising:
    at least one processor; and
    a non-transitory computer-readable medium coupled to the at least one processor having instructions stored thereon that, when executed by the at least one processor, causes the at least one processor to:
        in response to initializing an audio playout interrupt event, obtain a first reference time;

set a playout interrupt counter configured to count number of playout interrupt events;

write a segment of audio data to a sound card;

in response to writing the segment of audio data to the sound card, update the playout and obtain a second reference time; and calculate audio playout delay using the difference between the first and second reference times, a size of an audio playout buffer configured for storing audio data to be output by a playout device, and the updated playout interrupt counter multiplied by a length of the segment of audio data.

20. The system of claim 19, wherein the at least one processor is further caused to:

calculate the size of the audio playout buffer; and pass the contents of the audio playout buffer to the sound card.

21. The system of claim 19, wherein the at least one processor is further caused to:

update the playout interrupt counter by increasing the playout interrupt counter.

22. The system of claim 19, wherein the at least one processor is further caused to:

send the calculated audio playout delay to an audio processing component.

23. The system of claim 19, wherein the at least one processor is further caused to:

send the calculated audio playout delay to an acoustic echo canceller.

24. The system of claim 19, wherein the at least one processor is further caused to:

calculate the audio playout delay by combining the difference between the first and second reference times with the size of the audio playout buffer and the update playout interrupt counter multiplied by the length of the segment of audio data.

* * * * *